May 7, 1957 V. A. HOLMBERG 2,791,059
BAIT FISH LURE FOR RECEIVING A SMALL FISH AS BAIT
Filed July 3, 1952
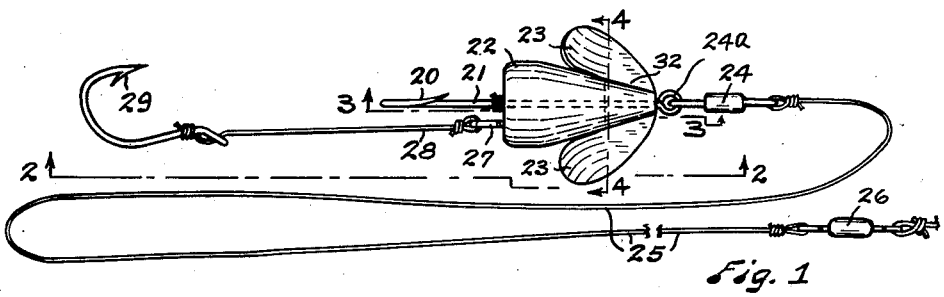
Fig. 1
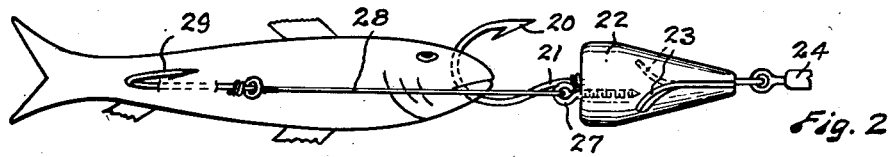
Fig. 2
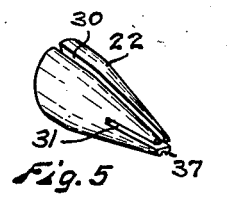
Fig. 5
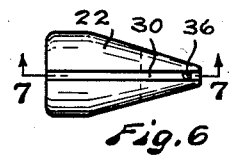
Fig. 6
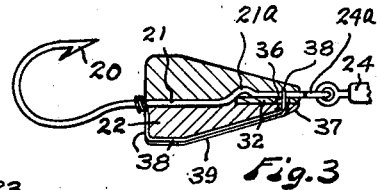
Fig. 3
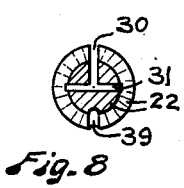
Fig. 8
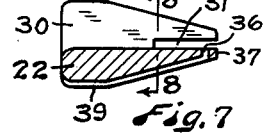
Fig. 7
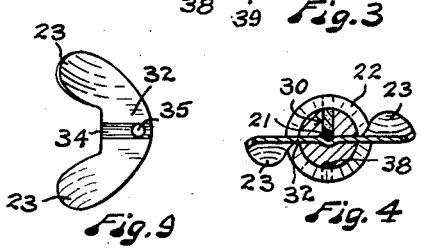
Fig. 9    Fig. 4
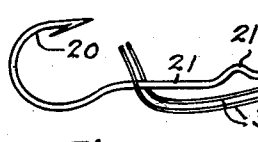
Fig. 10
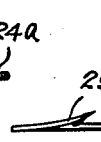
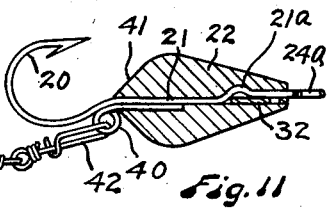
Fig. 11
INVENTOR.
Victor A. Holmberg
BY
ATTORNEY United States Patent Office 2,791,059
Patented May 7, 1957

2,791,059
BAIT FISH LURE FOR RECEIVING A SMALL FISH AS BAIT

Victor A. Holmberg, Tacoma, Wash.

Application July 3, 1952, Serial No. 297,055

3 Claims. (Cl. 43—44.2)

My invention relates to a bait fish lure for receiving a small fish as bait.

More particularly, my invention relates to a fish lure which has a first hook rigidly mounted in the body member of said lure and a flexibly connected hook whereby the fish bait secured on said hooks is given a spinning movement synchronous with that of the body member while the fish bait is at all times flexible throughout its body portion.

The fish lure of my invention will be described particularly as relates to salt water fishing and especially as relates to fishing for salmon. Herring are commonly used for the fish bait, but other fish as bull heads, minnows, candle fish, for example, may be employed instead of herring. Such examples are not exclusive but only exemplary and illustrative. It is the nature of salmon to charge into a school of herring striking and lashing right and left with their tails in order to wound as great a number of the herring as possible. Such herring are partially stunned and then as they gradually regain consciousness they start moving off with a spinning or wobbling movement. In other words, such fish are wounded and when the salmon circles back around or turns back after its charge into the school of herring, the salmon then takes after these wounded herring and swallows them as its meal. Thus, it is a primary object of my invention to produce a fishing lure which will cause the herring secured to the hooks to move and act in all respects as nearly as possible after the manner of wounded herring which have been stunned by a salmon. Obviously, such wounded herring are clearly and easily singled out from the rest of the thousands composing the school of herring and attracts the attention definitely of the salmon which the fisherman seeks to catch.

At the present time in practical fishing in this area, the following bait and lures are used: Dead herring are prepared for bait, according to one manner of baiting with herring, by cutting off one side or half of the herring free of the bones, thus forming a fillet. In doing this, a razor-sharp knife of fine steel is employed which knife is subject to rusting due to exposure to salt water. After the head is removed, the front end is cut from the top backward at an angle to present a flat diagonally or beveled and backwardly inclined face to the front end of said side of the fish. A hook is then secured through the front end and the said face when drawn through the water imparts a darting and spinning action and causes the bait to move through the water in a wobbly manner imitating somewhat a wounded herring.

Another method that has been followed is to tie the whole herring onto a single hook. According to this method, the hook is weaved through the mouth and out the gill and then pulled back to the tail part and extended through the tail at right angles to the vertical plane of the fish. The nose of the fish is then tied to the shank of the hook and the hook is pulled forward slightly so as to produce a kink in the fish. The eye of the shank of the hook may be secured to a swivel which in turn is secured to the leader. However, the difficulty with this manner of using herring as a bait is that if you get a strike without hooking the salmon, then the entire line must be reeled in, possibly some two hundred feet, and the hook rebaited as herring is straightened and spinning action lost. Such is an altogether time-consuming task during the very critical period when the fish are striking—often a period of relatively short duration. A line in the boat being rebaited does not catch fish.

A third manner of employing live herring as bait is to use a leader having a gang of triple hooks at the end and a single sliding hook mounted forward. This sliding hook is adjusted to the rest of the herring being used as bait. One of the gang hooks is put into the side of the tail and the leader passed under the fish and the single hook then applied to extend up through the throat and out through the nose of the fish to keep its mouth closed. The difficulty with this type of employing herring as bait is that the single front hook is, upon meeting objects such as a piece of seaweed or even the pressure of the water, subject to tearing loose from the fish and then all proper action of the fish as a lure is gone, and rebaiting is necessary with consequent loss of time right when the salmon are striking. The fact that the front hook must be slidably mounted to adjust the rigging to the rest of the herring to be employed as bait means that this may slide when it is not desired and thereby upset the position of the fish and destroy the proper action of the bait as a lure.

As stated in the literature, there have been suggested fish lures to impart spinning movements but these have not proven successful. At least such is the experience with those found on the market, particularly in the Pacific Northwest. Fish lures, as heretofore made, intended to impart spinning movement to the herring used as bait, are objectionable in that they do not impart a natural movement to the herring employed as bait. In providing a fish lure, the bait should be of a natural limberness from head to tail. The lure should be of a character which is adapted preferably to use a hook at the head and a hook at the tail of the fish used as bait. It happens that more salmon are caught on the head hook due to the nature or manner of striking of a salmon, as well as fish in general, as they swallow their prey head first. The head hook is generally disposed in a vertical plane through the fish's lower and upper lips and the tail hook is generally turned to 90° to the first hook and extended normally to the side of the fish near the tail.

A variation of the method of using herring for bait is to insert the hook under the gill and then with the fish in a bent position thread the hook through the body until the shank is entirely within the herring with just the eye of the shank extending out of the mouth and with the hook part extending through the sidewall of the fish near the tail.

A primary object of my invention is to provide a fish lure which has a member which imparts a controlled spinning motion to the bait itself. The second hook should be flexibly connected in relation to the first hook to permit natural flexibility of the bait body. The bait must be natural in all ways, for example, as in limberness and appearance and action, or movement through the water. Particularly, I have discovered that it is important to control the rate of spinning of the herring employed as the bait. Accordingly, the front hook which is secured to the head of the fish is formed integrally or rigidly with the body member mounting the spinner on which the spinner in turn is integrally mounted, and thus the bait is caused to spin synchronously with the body member. I have discovered that it is important that the hook be integral with the part which causes the spinning. With this relationship between the front hook and spinning producing member established, the next feature is to provide control for the spinner.

In short, the primary object of my invention is to spin the whole herring fish itself. For this reason, it is important to have the hook fixedly or spinningly mounted in the member on which the spinner is mounted in order to make the hook spin at the same rate as the spinner itself. Also thereby, I provide control for the rate of spinning. If the herring bait fish is caused to spin too fast then it does not resemble the action of a wounded herring. For this reason the rate of spinning must be controlled.

A primary object of my invention, therefore, is to provide a construction which will embody adjustable propeller blades to vary the pitch in order that the rate of spinning may be definitely controlled. Furthermore, when the lure may be set for fishing at one period of the day, it may not be found suitable for another part of the day when the tide is running swiftly. An increase or decrease in the flow of the tide obviously increases or decreases the rate of spinning. Adjustment of the blades to compensate for said change in the flow of the tide must be made to meet the substantial change in the rate of flow of tide.

In providing a construction which will be characterized by producing the above features as involves the integral forming of the front hook with the spinning or propeller part of the lure through its mounting member, I have discovered another important feature to which careful attention in a successful lure must be given. The fish lure of this character, particularly when used for fishing for salmon, may be employed with a device called a dodger which causes the lure to travel for a distance of about two feet in a substantial straight line and then is suddenly jerked to travel at an angle some two feet and then again at an angle so that intermittently the lure travels in substantially a straight course and during this period of travel the lure should be fairly steady and keep to the straight course. Accordingly, I have found that it is important to provide a member which will help in securing the steadiness of movement during the portion that it is travelling in a substantially straight line. This I accomplish with the form of the body member.

While I have described my lure particularly as adapted to herring, nevertheless, as stated above, the same is applicable to other types of bait fishing. Such bait may vary from narrow streamlined herring shape to the broad headed bull-head type. The lure for optimum results should permit, at least, the points of the hooks to be exposed. Also, it is to be understood that my lure is applicable to other types of fishing than salmon.

The above-mentioned general objects of my invention, together with others inherent in the same, are attained by the mechanism illustrated in the following drawings throughout which drawings like reference numerals indicate like parts:

Figure 1 is a view in elevation of a lure embodying my invention;

Fig. 2 is a side view of the same, looking in the direction of broken line 2—2 of Figure 1 and showing the same at right angles to the position shown in Figure 1 in combination with a bait fish secured thereto;

Fig. 3 is a view in longitudinal section taken substantially on broken line 3—3 of Figure 1;

Fig. 4 is a view in cross section taken substantially on broken line 4—4 of Figure 1;

Fig. 5 is a view in perspective of the body member of said invention;

Fig. 6 is a top plan view of said body member;

Fig. 7 is a longitudinal sectional view of said body member taken on broken line 7—7 of Fig. 6;

Fig. 8 is a view in cross section of said body member taken on broken line 8—8 of Fig. 7;

Fig. 9 is a detached view of the propeller member of my invention;

Fig. 10 is a detached schematic view showing the manner of applying a tie wire to the leading fish hook; and Fig. 11 is a modified form in longitudinal section, and the preferred form, of securing the second hook to the first hook formed with an eye mounted on its shank.

The lure comprises a first hook 20 with a long shank 21, preferably having a kink 21a, a steadying bullet-shaped body member 22 provided with fixedly mounted propeller blades 23 thereon. The shank 21 of the hook extends centrally and axially of the lure body member 22 and the point of the hook projects beyond the periphery of the member 22 and the substantial part of the adjacent curve of the hook 20 lies thus to one side of the axial center of the body member 22. This facilitates a spinning action as will be further described. A swivel 24 is secured in the eyelet 24a of the hook 20. To this swivel 24 is fastened a leader 25 having a swivel 26. In the blunt trailing end of the bullet-shaped body 22 may be secured an eyelet 27 to which is secured a short piece or connector of flexible catgut 28 and second hook 29, said connector being sufficiently long to permit securing the herring bait in a straight line without any bend in the body of the herring. Thus, no interference is present to the propeller blades imparting the desired type of spinning as well as rate of spinning.

The lure is made very strong and rugged, especially being designed to catch salmon which run from 5 to 60 or more pounds. It is characterized by its precision of construction to provide precision of action and wide applicability. In making the lure, a groove 30 is formed in the bullet-shaped body 22, extending from the longitudinal axis radially to the surface. Also, a transverse slot 31 is axially disposed in the body 22. Into this slot is placed the base 32 of the propeller member 23—said base having a groove 34 and a hole 35 (Figs. 3 and 7) and the body 22 has the hole 36 through the projection 37. The shank 21 is placed in the groove 34 of the base 32. Thus, the shank 21 of the hook 20 functions cooperatively in securing in position the base 32 with its propeller blades 23. Then these parts may be secured in place as follows:

A short piece of wire 38 (Fig. 10) is bent upon itself and the ends pushed down one on each side of the shank 21 and through the hole 35 of the base 32 of the propeller blades 23 and hole 36. Said wire 38 is pulled taut and then led to the rear end of the body 22 in a shallow longitudinal groove 39 (Fig. 8) in the surface portion of said body 22 and then wrapped tightly around the shank 21 securing the same in place. The said grooves 30 and 39 may be filled with water resistant glue. The lure, including exposed blades 23 and the body 22, may be painted with aluminum or gray paint. A neutral color may be employed in order not to detract from the herring bait.

In Fig. 11, a modified and preferred form of first hook 20 has an eyelet 40 welded to or formed a part of the shank 21 on the hook end portion. Thus, the connector 28 may be secured to said eyelet 40 and the strain directed axially through the body member 22 to the leader, thus removing substantially all strain on the body member 22. The body member 22 is preferably provided with streamlined rear portion 41 tapering to the shank 21 of the hook, thus preventing any chance of the development of burbling. Said connector 28 may be provided with a snap 42, thereby permitting fast assembly or changes. It will be understood, that connectors 28 of varying length for use with fish bait of different length will be provided—all having snaps so that quick change can be made.

Since the fish's habit is to swallow its prey head-first, it is preferable to have the lure of a size and so designed as to not only cause the bait to have the movements of a wounded herring but also not to interfere with the fish attempting to seize the herring in a manner to permit swallowing the same head-first. The long shank 21 contributes in such seizing of the fish bait. The propeller blades are formed closely built with the body 22 which construction also aids steadiness of movement of the body member 22. The body 22 itself may be of a size which permits being received into the mouth of even the smaller salmon when striking at an angle. Nevertheless, the second hook 29 functions also in engaging a striking salmon when it may miss the first hook 20, and it also functions to catch the striking fish when it may strike from the rear.

Manifestly, much of the value of my fish lure may be had even when the second hook 29 is removed. This may occur by omitting initially the said second hook and connector 28 or when the same is broken away by a fish. An efficient lure still remains to permit continuing fishing.

The above describes the lure construction when the body 22 is formed of wood. Of course, the material employed in forming such body of the lure may be varied. Plastic may be a substitute, and the form shown in Fig. 11 is particularly adapted for such material. In such case the plastic would be molded about the shank 21 and the propeller base 32. Preferably, the propeller blades should be of bendable metal to permit bending so as to adjust the blades to vary the pitch of the propeller and thus to vary the speed of the spinning.

The mode of operation is in large measure set forth above. Since the fish bait is secured with hook 20 disposed vertically through the mouth of the fish bait or herring, and the hook 20 is integrally formed with the body member 22, i. e. the curved portion of the hook provides a substantially lateral pivot axis through the head portion of the whole fish bait (see Fig. 2), and the propeller blades 23 are integrally formed with the body member 22, the fish bait is positively caused to spin and is free to flex in a normal manner. Also, it is directly caused to spin at the rate determined by the pitch of the propeller blades 23. Since the blades 23 are of a bendable metal, the pitch can be altered as the rate of the tide flow or the speed of the boat or other circumstance may require.

The hook 20 is preferably inserted vertically through the under and upper jaw with point exposed as shown in Fig. 2. The hook 29 is preferably inserted into the tail end portion of the fish bait by pressing its point into the side of the fish with said point directed towards the tail and turned so that the point is directed towards the head as shown in Fig. 2, with the point and part of the shank exposed. Particularly be it noted that said body member 22 functions in a very important manner. It provides (1) a mounting means for the propeller blades, and this in an adjustable manner to vary the pitch and thus the speed of spinning; (2) provides for rigidly mounting the hook therein, thereby providing for directly applying a rotating force to the fish bait; and (3) above all, said member provides a steadying effect upon the fish bait in moving through the water. Herring are commonly used as fish bait and are characterized by having a relatively flat body. This flatness tends to nullify the spinning action unless special provision is made to control said tendency. In my invention, the body member is expressly provided to accomplish said control and provide natural spinning action in the water for the herring bait—"natural" that is for a crippled herring as it moves through the water after being wounded. A flat board attached to a line at its front end portion manifestly will have a different action when pulled through the water than when a round body is formed on the front end portion. The body member 22 of my invention functions as said "round body." The bullet form of said body member 22 is my preferred form.

The hooks are adapted to receive strips of pork rind, or fish strips, for use in trout or bass fishing. Thus, the lure disclosed herein is adapted for a wide range of uses and conditions not only for trolling but casting as well. The size of the lure will vary with the kind of fish sought, whether trout, bass, salmon, tarpon or swordfish. The reason for its wide adaptability is the fact that the lure presents the bait in full natural wholly uncovered size and color appearance and with natural crippled action or movement through the water. The bait fish can be that natural to the locality and natural to the water being fished whether stream, lake, bay or ocean. Even when the bait fish is marred or disfigured by an ineffectual strike, nevertheless the spinning and movement through the water remains substantially natural for that of a crippled or wounded fish bait.

The bullet shape form of the body member 22 provides for a steadying movement of the lure through the water. The preferred form shown in Fig. 11 has easy "let go" or streamlined rear portion 41 which avoids all chance of causing a burbling of the water in the wake of the body member 22 which would destroy the naturalness of the lure in resembling the action of a crippled bait fish.

In applying the bait in the form of a fish, the rear hook must not draw the herring into a bend—the said bait must be axially straight for best results. Any bend in the body of the fish will counteract the action of the propeller blades 23.

Moreover, my invention provides a fish lure for receiving a fish bait characterized by its economy in manufacture and simplicity of construction, as well as the fact that a minimum of metal is involved.

I claim:

1. A bait fish lure for receiving a small fish as bait comprising a solid body of conical form having a transversely disposed slot in the pointed end portion of said body and a longitudinally disposed slot extending from the longitudinal axis radially to the surface of said body; a hook having its shank rigidly disposed in said longitudinal slot with the eye of the shank protruding from the pointed end of the conical body and the bend of the hook disposed adjacent the axis of the shank; a propeller member having a base with a hole disposed in said transversely disposed slot in the pointed end of said body; and a wire member engaging said hook shank forwardly, threaded through said base hole and extending over said body and secured about said hook shank rearwardly of said body.

2. A fish lure for receiving a whole fish bait and permitting natural limberness thereof from head to tail comprising a body member of bullet shape whereby a steadying effect is provided to said lure, a single hook with its shank rigidly secured within said body member and its eye at the front end of said body member, the hook portion thereof extending beyond the circumference of said body member and a substantial part of the curved portion thereof lying to one side of the axial center of the body member and thus providing a pivot axis through the head portion of said whole fish bait substantially laterally of the axial center of said body member; oppositely disposed propeller blades fixedly mounted on said body member; a flexible hook connector secured to said body member; and a second hook secured to said flexible hook connector in spaced relation to said first hook about the length of said whole fish bait.

3. A fish lure for receiving a natural whole fish as bait and permitting natural limberness thereof from head to tail comprising a single fish hook having a shank portion and a curved hook portion, said curved portion providing a substantially lateral pivot axis through the head portion of said whole fish bait; a solid conical-shaped body member fixedly connected to said shank portion of said hook and having a diameter sufficiently small so that the point of said fish hook extends transversely beyond the circumference of said body member and a substantial part of the curved portion of said hook lies to one side of the axial center of said body member;

oppositely arranged bendable propeller blades extending outwardly from the forward end of said body member with said blades bearing upon the inclined conical walls of said body member; and a second hook spaced from and flexibly attached to said body member, such spaced relation allowing said second hook to be passed through the tail portion of said whole fish bait without interference with the naturalness of movement and limberness of body thereof when subjected to a spinning action.

References Cited in the file of this patent

UNITED STATES PATENTS

| | | |
|---|---|---|
| 2,047,676 | Edmundson | July 14, 1936 |
| 2,295,765 | Weber | Sept. 15, 1942 |
| 2,316,048 | Clark | Apr. 6, 1943 |
| 2,516,039 | Wysack | July 18, 1950 |
| 2,596,457 | Wulff | May 13, 1952 |

FOREIGN PATENTS

| | | |
|---|---|---|
| 22,472 | Great Britain | 1906 |
| 155,523 | Great Britain | Dec. 23, 1920 |
| 185,874 | Great Britain | Sept. 21, 1922 |
| 270,474 | Switzerland | Nov. 16, 1950 |
| 439,777 | France | June 22, 1912 |